United States Patent
Li (10) Patent No.: US 11,747,921 B2
(45) Date of Patent: Sep. 5, 2023

(54) HANDWRITING GENERATION METHOD AND APPARATUS, STORAGE MEDIUM, ELECTRONIC DEVICE, AND SYSTEM

(71) Applicant: SHENZHEN HITEVISION TECHNOLOGY CO., LTD., Guangdong (CN)

(72) Inventor: Junfeng Li, Guangdong (CN)

(73) Assignee: SHENZHEN HITEVISION TECHNOLOGY CO., LTD., Shenzhen (CN)

( * ) Notice: Subject to any disclaimer, the term of this patent is extended or adjusted under 35 U.S.C. 154(b) by 0 days.

(21) Appl. No.: 17/788,759

(22) PCT Filed: Jul. 20, 2020

(86) PCT No.: PCT/CN2020/103073
§ 371 (c)(1),
(2) Date: Jun. 24, 2022

(87) PCT Pub. No.: WO2021/128819
PCT Pub. Date: Jul. 1, 2021

(65) Prior Publication Data
US 2023/0037737 A1 Feb. 9, 2023

(30) Foreign Application Priority Data
Dec. 25, 2019 (CN) .......................... 201911354996.5

(51) Int. Cl.
*G06F 3/038* (2013.01)
*G06F 3/0354* (2013.01)
*G06F 3/041* (2006.01)

(52) U.S. Cl.
CPC .......... *G06F 3/038* (2013.01); *G06F 3/03545* (2013.01); *G06F 3/0416* (2013.01)

(58) Field of Classification Search
None
See application file for complete search history.

(56) References Cited

U.S. PATENT DOCUMENTS

2014/0009421 A1 1/2014 Lee et al.
2019/0369865 A1* 12/2019 Xia ..................... G06F 3/03545

FOREIGN PATENT DOCUMENTS

| CN | 102722312 A | 10/2012 |
| CN | 103984485 A | 8/2014 |

(Continued)

OTHER PUBLICATIONS

PCT International Search Report for PCT/CN2020/103073, dated Oct. 30, 2020, 12 pages.

(Continued)

*Primary Examiner* — Stephen T. Reed
(74) *Attorney, Agent, or Firm* — East IP P.C.

(57) ABSTRACT

The present application discloses a handwriting generation method and apparatus, a storage medium, an electronic device, and a system, which relate to the technical field of data processing. In the method, according to the acquisition time of the writing coordinate data collected by the first device and the acquisition time of the writing pressure data collected by the second device, the writing coordinate data and the writing pressure data may be matched to obtain accurate fused writing information, and handwriting may be finally generated according to the fused writing information.

11 Claims, 6 Drawing Sheets

(56) References Cited

FOREIGN PATENT DOCUMENTS

| CN | 106125978 A | 11/2016 |
|---|---|---|
| CN | 107305432 A | 10/2017 |
| CN | 109032390 A | 12/2018 |
| CN | 111273797 A | 6/2020 |

OTHER PUBLICATIONS

The First Office Action for Chinese Application No. 201911354996.5, dated Dec. 2, 2020, 7 pages.
The Notification to Grant Patent Right for Invention for Chinese Application No. 201911354996.5, dated May 26, 2021, 6 pages.

* cited by examiner

HANDWRITING GENERATION METHOD AND APPARATUS, STORAGE MEDIUM, ELECTRONIC DEVICE, AND SYSTEM

CROSS-REFERENCE TO RELATED APPLICATIONS

The present application is a National Stage of International Application No. PCT/CN2020/103073 filed on Jul. 20, 2020, which claims priority to Chinese patent application No. 201911354996.5, filed on Dec. 25, 2019 and entitled "HANDWRITING GENERATION METHOD AND APPARATUS, STORAGE MEDIUM, ELECTRONIC DEVICE, AND SYSTEM", both of which are hereby incorporated by reference in their entireties.

TECHNICAL FIELD

The present application relates to a technical field of data processing, and in particular to a handwriting generation method and apparatus, a storage medium, an electronic device and a system.

BACKGROUND

At present, there are some special pens on the market that can provide pressure information. When the pen writes on an interactive panel, it can inform the system of 2048-level pressure information through Bluetooth, network and other means. Then, the system combines the pressure information with the writing coordinate information collected by the interactive panel through the writing software, so as to generate handwriting with varying thickness.

However, at present, in the process of combining the pressure information and the writing coordinate information, there is usually a problem of inaccurate matching of the pressure information and the writing coordinate information, which in turn leads to an unsatisfactory effect of the final generated handwriting.

SUMMARY

The embodiments of the present application provide a handwriting generation method and apparatus, a storage medium, an electronic device and a system, so as to solve the above problem in the prior art.

In order to achieve the above purpose, the technical solutions adopted in the embodiments of the present application are as follows.

In a first aspect, the embodiments of the present application provide a method for generating handwriting, wherein the method is applied to an electronic device including a first device, and the electronic device is communicatively connected to a second device, wherein the first device is configured to collect writing coordinate data, the second device is configured to collect writing pressure data, and the method includes:
  acquiring the writing coordinate data collected by the first device and the writing pressure data collected by the second device;
  matching the writing coordinate data and the writing pressure data according to acquisition time of the writing coordinate data and acquisition time of the writing pressure data, so as to obtain fused writing information;
  generating the handwriting according to the fused writing information.

Optionally, in an embodiment of the present application, before matching the writing coordinate data and the writing pressure data according to the acquisition time of the writing coordinate data and the acquisition time of the writing pressure data, the method further includes:
  packaging and writing the writing coordinate data and the acquisition time of the writing coordinate data into a first cache queue;
  packaging and writing the writing pressure data and the acquisition time of the writing pressure data into a second cache queue.

Optionally, in an embodiment of the present application, packaging and writing the writing pressure data and the acquisition time of the writing pressure data into the second cache queue includes:
  determining whether latest received writing pressure data is zero;
  under a condition that the latest received writing pressure data is not zero, packaging and writing the latest received writing pressure data and acquisition time of the latest received writing pressure data into the second cache queue;
  under a condition that the latest received writing pressure data is zero, determining whether last writing pressure data in the second cache queue is zero;
  under a condition that the last writing pressure data in the second cache queue is zero, replacing the last writing pressure data in the second cache queue with the latest received writing pressure data, and replacing acquisition time corresponding to the last writing pressure data in the second cache queue with the acquisition time of the latest received writing pressure data;
  under a condition that the last writing pressure data in the second cache queue is not zero, packaging and writing the latest received writing pressure data and the acquisition time of the latest received writing pressure data into the second cache queue.

Optionally, in an embodiment of the present application, matching the writing coordinate data and the writing pressure data according to the acquisition time of the writing coordinate data and the acquisition time of the writing pressure data, so as to obtain fused writing information includes:
  obtaining receipt time difference between the writing coordinate data and matched writing pressure data according to first acquisition time of first writing coordinate data in the first cache queue and second acquisition time of first non-zero writing pressure data in the second cache queue;
  calibrating acquisition time of each writing pressure data in the second cache queue according to the receipt time difference, so as to obtain calibration time corresponding to each writing pressure data;
  searching for writing pressure data matching each writing coordinate data in the second cache queue based on the calibration time, and combining each writing coordinate data with matched writing pressure data to obtain the fused writing information.

Optionally, in an embodiment of the present application, the writing coordinate data corresponding to a current writing action includes pen-down point coordinate data and pen-up point coordinate data, and searching for the writing pressure data matching each writing coordinate data in the second cache queue based on the calibration time includes:
  searching, from head of the second cache queue, for writing pressure data whose calibration time is closest to acquisition time of the pen-down point coordinate data, and using the searched writing pressure data as the writing pressure data matching the pen-down point coordinate data of the current writing action;

using writing pressure data matching writing coordinate data located just before the pen-up point coordinate data of the current writing action as the writing pressure data matching the pen-up point coordinate data, or searching, from next one of the writing pressure data matching the writing coordinate data located just before the pen-up point coordinate data of the current writing action, for writing pressure data whose calibration time is closest to acquisition time of the pen-up point coordinate data as the writing pressure data matching the pen-up point coordinate data.

Optionally, in an embodiment of the present application, the writing coordinate data corresponding to the current writing action further includes moving point coordinate data, and acquisition time of the moving point coordinate data is between the acquisition time of the pen-down point coordinate data and the acquisition time of the pen-up point coordinate data, wherein searching for the writing pressure data matching each writing coordinate data in the second cache queue based on the calibration time further includes:

searching, from next one of the writing pressure data matching the pen-down point coordinate data, for writing pressure data whose calibration time is closest to the acquisition time of the moving point coordinate data as the writing pressure data matching the moving point coordinate data.

Optionally, in an embodiment of the present application, before searching, from the next one of the writing pressure data matching the pen-down point coordinate data, for writing pressure data whose calibration time is closest to the acquisition time of the moving point coordinate data as the writing pressure data matching the moving point coordinate data, the method further includes:

determining whether the moving point coordinate data is first moving point coordinate data of the current writing action;

under a condition that the moving point coordinate data is the first moving point coordinate data of the current writing action, performing step of searching, from next one of the writing pressure data matching the pen-down point coordinate data of the current writing action, for writing pressure data whose calibration time is closest to the acquisition time of the moving point coordinate data as the writing pressure data matching the moving point coordinate data;

under a condition that the moving point coordinate data is not the first moving point coordinate data of the current writing action, searching, from next one of writing pressure data matching previous moving point coordinate data of the current writing action, for writing pressure data whose calibration time is closest to the acquisition time of the moving point coordinate data as the writing pressure data matching the moving point coordinate data.

Optionally, in an embodiment of the present application, searching for the writing pressure data matching each writing coordinate data in the second cache queue based on the calibration time further includes:

searching in the second cache queue for target writing pressure data whose calibration time is closest to the acquisition time of the writing coordinate data;

under a condition that more than one target writing pressure data is acquired, using an average value of all target writing pressure data as the writing pressure data matching the writing coordinate data.

Optionally, in an embodiment of the present application, the method further includes:

detecting a first cache duration for the writing coordinate data written into the first cache queue, and detecting a second cache duration for the writing pressure data written into the second cache queue;

deleting from the first cache queue the writing coordinate data whose first cache duration is greater than a first preset threshold, and deleting from the second cache queue the writing pressure data whose second cache duration is greater than a second preset threshold.

In a second aspect, the embodiments of the present application provide an apparatus for generating handwriting, wherein the apparatus is applied to an electronic device including a first device, and the electronic device is communicatively connected to a second device, wherein the first device is configured to collect writing coordinate data, the second device is configured to collect writing pressure data, and the apparatus for generating handwriting includes:

an acquiring module configured to acquire the writing coordinate data collected by the first device and the writing pressure data collected by the second device;

a matching module configured to match the writing coordinate data and the writing pressure data according to acquisition time of the writing coordinate data and acquisition time of the writing pressure data, so as to obtain fused writing information;

a generating module configured to generate the handwriting according to the fused writing information.

Optionally, in an embodiment of the present application, the apparatus for generating handwriting further includes a cache module configured to:

package and write the writing coordinate data and the acquisition time of the writing coordinate data into a first cache queue;

package and write the writing pressure data and the acquisition time of the writing pressure data into a second cache queue.

Optionally, in an embodiment of the present application, when packaging and writing the writing pressure data and the acquisition time of the writing pressure data into the second cache queue, the cache module is specifically configured to:

determine whether latest received writing pressure data is zero;

under a condition that the latest received writing pressure data is not zero, package and write the latest received writing pressure data and acquisition time of the latest received writing pressure data into the second cache queue;

under a condition that the latest received writing pressure data is zero, determine whether last writing pressure data in the second cache queue is zero;

under a condition that the last writing pressure data in the second cache queue is zero, replace the last writing pressure data in the second cache queue with the latest received writing pressure data, and replace acquisition time corresponding to the last writing pressure data in the second cache queue with the acquisition time of the latest received writing pressure data;

under a condition that the last writing pressure data in the second cache queue is not zero, package and write the latest received writing pressure data and the acquisition time of the latest received writing pressure data into the second cache queue.

Optionally, in an embodiment of the present application, the matching module is specifically configured to:

obtain receipt time difference between the writing coordinate data and matched writing pressure data according to first acquisition time of first writing coordinate data in the first cache queue and second acquisition time of first non-zero writing pressure data in the second cache queue;

calibrate acquisition time of each writing pressure data in the second cache queue according to the receipt time difference, so as to obtain calibration time corresponding to each writing pressure data;

search for writing pressure data matching each writing coordinate data in the second cache queue based on the calibration time, and combine each writing coordinate data with matched writing pressure data to obtain the fused writing information.

Optionally, the writing coordinate data corresponding to a current writing action includes pen-down point coordinate data and pen-up point coordinate data, and the matching module is specifically configured to:

search, from head of the second cache queue, for writing pressure data whose calibration time is closest to acquisition time of the pen-down point coordinate data, and use the searched writing pressure data as the writing pressure data matching the pen-down point coordinate data of the current writing action;

use writing pressure data matching writing coordinate data located just before the pen-up point coordinate data of the current writing action as the writing pressure data matching the pen-up point coordinate data, or search, from next one of the writing pressure data matching the writing coordinate data located just before the pen-up point coordinate data of the current writing action, for writing pressure data whose calibration time is closest to acquisition time of the pen-up point coordinate data as the writing pressure data matching the pen-up point coordinate data.

Optionally, the writing coordinate data corresponding to the current writing action further includes moving point coordinate data, and acquisition time of the moving point coordinate data is between the acquisition time of the pen-down point coordinate data and the acquisition time of the pen-up point coordinate data, wherein the matching module is further specifically configured to:

search, from next one of the writing pressure data matching the pen-down point coordinate data, for writing pressure data whose calibration time is closest to the acquisition time of the moving point coordinate data as the writing pressure data matching the moving point coordinate data.

Optionally, in an embodiment of the present application, the matching module is further configured to:

before search, from the next one of the writing pressure data matching the pen-down point coordinate data, for writing pressure data whose calibration time is closest to the acquisition time of the moving point coordinate data as the writing pressure data matching the moving point coordinate data, determine whether the moving point coordinate data is first moving point coordinate data of the current writing action;

under a condition that the moving point coordinate data is the first moving point coordinate data of the current writing action, search, from next one of the writing pressure data matching the pen-down point coordinate data of the current writing action, for writing pressure data whose calibration time is closest to the acquisition time of the moving point coordinate data as the writing pressure data matching the moving point coordinate data;

under a condition that the moving point coordinate data is not the first moving point coordinate data of the current writing action, search, from next one of writing pressure data matching previous moving point coordinate data of the current writing action, for writing pressure data whose calibration time is closest to the acquisition time of the moving point coordinate data as the writing pressure data matching the moving point coordinate data.

Optionally, in an embodiment of the present application, the matching module is further configured to:

search in the second cache queue for target writing pressure data whose calibration time is closest to the acquisition time of the writing coordinate data;

under a condition that more than one target writing pressure data is acquired, use an average value of all target writing pressure data as the writing pressure data matching the writing coordinate data.

Optionally, in an embodiment of the present application, the apparatus for generating handwriting further includes a deleting module configured to:

detect a first cache duration for the writing coordinate data written into the first cache queue, and detect a second cache duration for the writing pressure data written into the second cache queue;

delete from the first cache queue the writing coordinate data whose first cache duration is greater than a first preset threshold, and delete from the second cache queue the writing pressure data whose second cache duration is greater than a second preset threshold.

In a third aspect, the embodiments of the present application provide a storage medium including a computer program, wherein the computer program is configured to implement the method described above.

In a fourth aspect, the embodiments of the present application provide an electronic device including a memory and a processor, wherein the memory is configured to store a computer program, and the processor is configured to load and execute the computer program to cause the electronic device to perform the method described above.

In a fifth aspect, the embodiments of the present application provide a system for generating handwriting, wherein the system includes a second device and the electronic device described above.

BRIEF DESCRIPTION OF THE DRAWINGS

Description of the Drawings

In order to illustrate the technical solutions in the embodiments of the present application more clearly, the accompanying drawings used in the description of the embodiments will be briefly introduced below. Obviously, the accompanying drawings in the following description are some embodiments of the present application. For those of ordinary skill in the art, other drawings can also be obtained from these drawings without creative effort.

Reference numbers: 20—electronic device; 21—memory; 22—storage controller; 23—processor; 70—apparatus for generating handwriting; 701—acquiring module; 702—matching module; 703—generating module; 704—cache module; 705—deleting module.

DETAILED DESCRIPTION

Embodiments of the Present Application

In order to better understand the above technical solutions, the above technical solutions will be described in detail below with reference to the accompanying drawings and specific embodiments. The following embodiments and the features in the embodiments may be combined with each other without conflict.

It should be noted that, in the description of the present application, the terms "first", "second" and the like are only used to distinguish the description, and cannot be understood as indicating or implying relative importance.

With the popularization of dust-free devices such as electronic whiteboards, more and more educational institutions apply the electronic whiteboards to teaching. The electronic whiteboard can collect the writing coordinate data in real time through an interactive panel, and at the same time collect the writing pressure data in real time through a stylus. Then, the electronic whiteboard can combine the coordinate data with the pressure data, so as to generate on the electronic whiteboard the handwriting that changes with the writing pressure and the writing coordinate.

However, since the transmission paths and the transmission speeds of the writing pressure data collected by the stylus and the writing coordinate data collected by the interactive panel are different, and the collection frequencies of the writing pressure data and the writing coordinate data may also be different, there is usually a problem of inaccurate matching when combining the writing pressure data and the writing coordinate data in the prior art, which in turn leads to an unsatisfactory effect of the handwriting finally generated by the electronic whiteboard.

In view of the above problems, the embodiments of the present application provide a handwriting generation method and apparatus, a storage medium, an electronic device and a system, so as to improve the accuracy of matching of the writing coordinate data and the writing pressure data, thereby improving the effect of handwriting generated by the electronic whiteboard.

Figure 1:
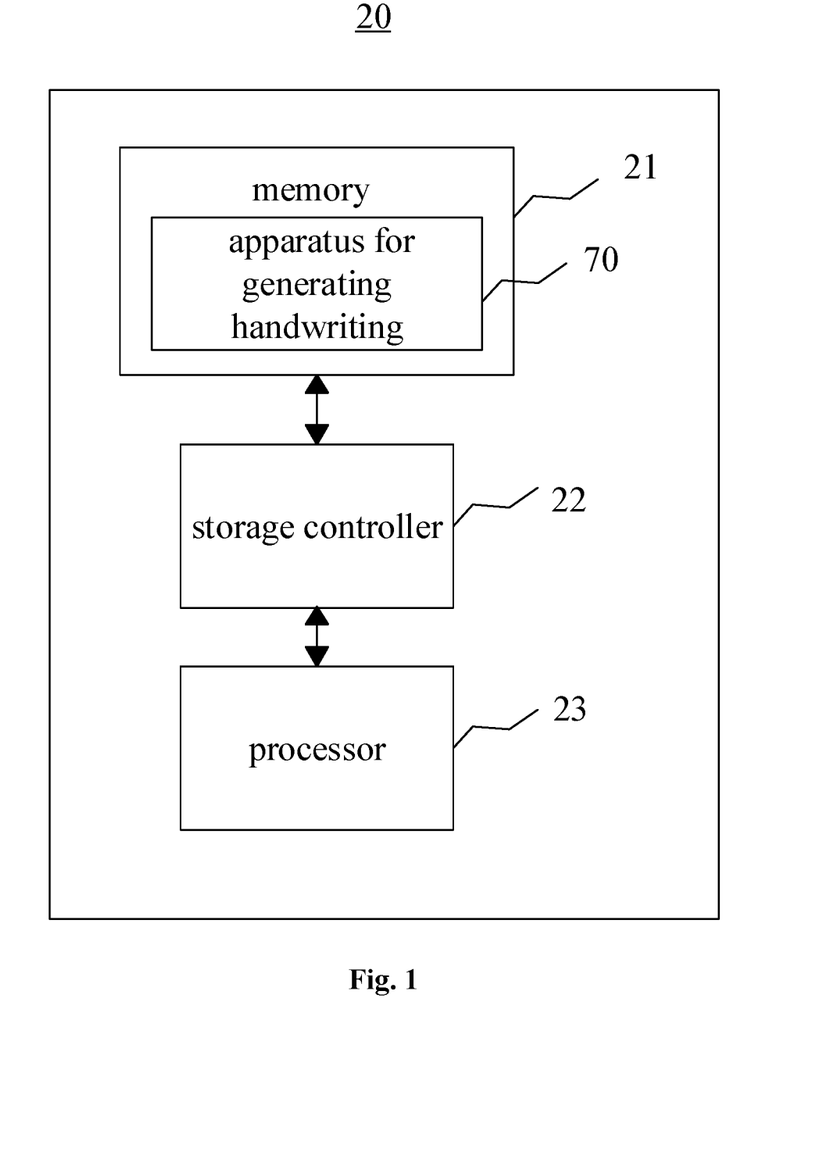
FIG. 1 is a schematic structural diagram of an electronic device provided by an embodiment of the present application.

Referring to FIG. 1, FIG. 1 is a schematic structural diagram of an electronic device 20 provided by an embodiment of the present application. The electronic device 20 includes an apparatus 70 for generating handwriting, a memory 21, a memory controller 22 and a processor 23.

The elements of the memory 21, the memory controller 22 and the processor 23 are directly or indirectly electrically connected to each other to realize data transmission or interaction. For example, these elements may be electrically connected to each other through one or more communication buses or signal lines. The apparatus 70 for generating handwriting may include at least one software function module which may be stored in the memory 21 in the form of software or firmware or solidified in an operating system (OS) of the electronic device 20. The processor 23 is configured to execute executable modules stored in the memory 21, such as software function modules and computer programs included in the apparatus 70 for generating handwriting, so that the electronic device 20 executes the method for generating handwriting below.

It should be noted that, in this embodiment of the present application, the above electronic device 20 may include a first device, and the electronic device 20 is also communicatively connected to a second device, thereby constituting a system for generating handwriting. The electronic device 20 is configured to acquire the writing coordinate data collected by the first device and the writing pressure data collected by the second device, fuse the writing coordinate data with the writing pressure data through the method for generating handwriting described below, and then according to the fused writing information, generate handwriting that changes with the writing pressure data and the writing coordinate data.

In the embodiments of the present application, the first device may be, but not limited to, a touch panel; the second device may be, but not limited to, a stylus. The first device is configured to collect the writing coordinate data (that is, the position coordinate data of the contact point between the stylus and the touch panel when the user writes on the touch panel with the stylus), and the second device is configured to collect the writing pressure data (that is, the contact pressure data between the stylus and the touch panel when the user writes on the touch panel with the stylus).

In addition, in this embodiment of the present application, the electronic device 20 may further include a display device configured to display the handwriting obtained by processing the above writing coordinate data and writing pressure data, and the handwriting changes with the writing pressure data and the writing coordinate data.

It should also be noted that, in the above system for generating handwriting, the display device and the first device may be two independent entities, or may be integrated into one entity. When the display device is integrated with the first device, a touch display screen is formed.

The method for generating handwriting provided by the embodiments of the present application will be described in detail below with reference to FIGS. 2 to 5.

Figure 2:
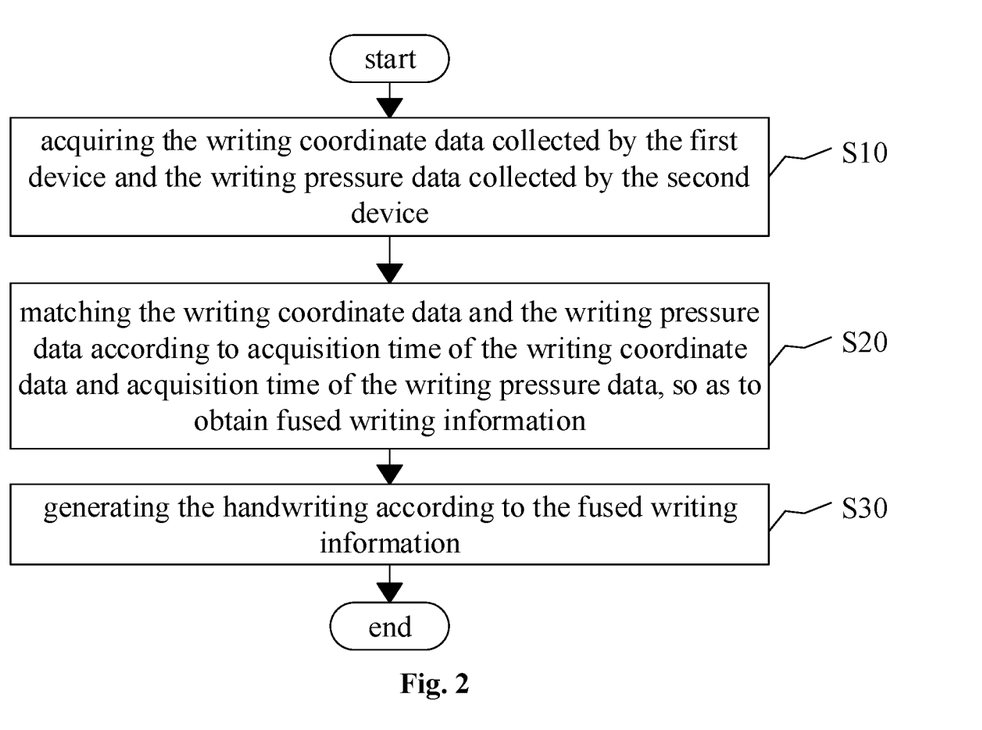
FIG. 2 is a schematic flowchart of steps of a method for generating handwriting provided by an embodiment of the present application.

Referring to FIG. 2, FIG. 2 is a schematic flowchart of steps of a method for generating handwriting provided by an embodiment of the present application. The method can be applied to the electronic device 20 described above, so as to provide the electronic device 20 with a function of generating handwriting.

In the embodiments of the present application, the electronic device 20 includes a first device configured to collect writing coordinate data, and the electronic device 20 is communicatively connected to a second device configured to collect writing pressure data. The method includes steps S10 to S30.

Step S10: acquiring the writing coordinate data collected by the first device and the writing pressure data collected by the second device.

Step S20: matching the writing coordinate data and the writing pressure data according to acquisition time of the writing coordinate data and acquisition time of the writing pressure data, so as to obtain fused writing information.

Step S30: generating the handwriting according to the fused writing information.

As described above, in the embodiments of the present application, the first device may be, but not limited to, a touch panel; and the second device may be, but not limited to, a stylus. Here, the writing coordinate data is the position coordinate data of the contact point between the second device and the first device when the user performs a writing operation on the first device through the second device; the writing pressure data represents the contact pressure data between the second device and the first device when the user performs the writing operation on the first device through the second device.

Specifically, in a possible embodiment, the first device is a touch display screen, and the first device transmits the collected writing coordinate data to the processor of the electronic device 20 through a bus. The second device is a stylus with a function of detecting writing pressure, and the second device can transmit the collected writing pressure data to the processor of the electronic device 20 by means of Bluetooth, Wi-Fi, infrared transmission and the like.

When the electronic device 20 acquires the writing coordinate data collected by the first device and the writing pressure data collected by the second device, it can record the acquisition time corresponding to each writing coordinate data and each writing pressure data, and then match the writing coordinate data and the writing pressure data according to the acquisition time thereof to obtain fused writing information, and finally generate the corresponding handwriting according to the fused writing information.

It should be understood that, in the embodiments of the present application, the fused writing information represents a combination of the writing coordinate data and the matched writing pressure data. For example, in a certain writing action, when the writing coordinate data of the pen-down point collected by the first device is (30, 50), and the writing pressure data of the pen-down point collected by the second device is 500, the fused writing information corresponding to the pen-down point can be represented as D1 (30, 50, 500).

It should also be understood that, in the embodiments of the present application, the above writing coordinate data (30, 50) represent the relative position of the contact point between the second device and the first device relative to the first device during writing, and the writing pressure data 500 represents the pressure level corresponding to the contact pressure data between the second device and the first device during writing. Moreover, in the embodiments of the present application, different line widths can be configured for different contact pressure levels. After the electronic device 20 obtains the fused writing information, the electronic device can generate the handwriting having a corresponding line width at the corresponding position according to the writing coordinate data and the writing pressure data therein, which makes the handwriting more realistic, thereby improving the writing effect and the user's writing experience.

In some possible implementations of the embodiments of the present application, before the above step S20, the method may be further include step S15.

Step S15: packaging and writing the writing coordinate data and the corresponding acquisition time of the writing coordinate data into a first cache queue,
    packaging and writing the writing pressure data and the corresponding acquisition time of the writing pressure data into a second cache queue.

In the embodiments of the present application, after acquiring the writing coordinate data collected by the first device and the writing pressure data collected by the second device, the electronic device 20 can sequentially write the writing coordinate data into the first cache queue according to the acquisition time, and sequentially write the writing pressure data into the second cache queue according to the acquisition time. At the same time, the acquisition time of each writing coordinate data and each writing pressure data can also be recorded, so as to facilitate the matching of the writing coordinate data and the writing pressure data in the subsequent process. Moreover, in the embodiments of the present application, in order to facilitate the management of the writing coordinate data, the writing pressure data and their corresponding acquisition time, each writing coordinate data and its corresponding acquisition time can be packaged and written into the first cache queue, and each writing pressure data and its corresponding acquisition time can be packaged and written into the second cache queue.

Figure 3:
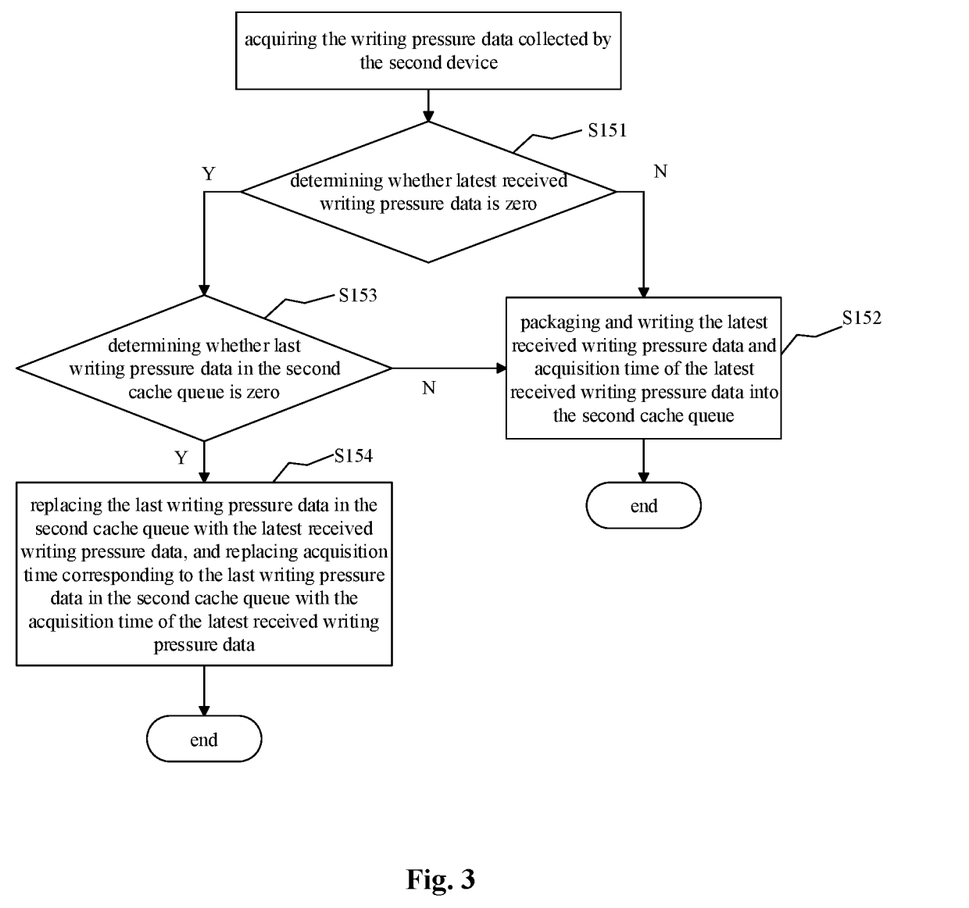
FIG. 3 is a schematic flowchart of sub-steps of step S20 in FIG. 2.

Referring to FIG. 3, considering that a large amount of invalid data with zero pressure value will be collected when the stylus is lifted during the writing process, in order to avoid the large amount of invalid data being written into the second cache queue and occupying unnecessary storage space, in an embodiment of the present application, the step of writing the writing pressure data collected by the second device into the second cache queue may include sub-steps S151 to S154.

Sub-step S151: determining whether latest received writing pressure data is zero.

Under a condition that the latest received writing pressure data is not zero, sub-step S152 is performed: packaging and writing the latest received writing pressure data and acquisition time of the latest received writing pressure data into the second cache queue.

Under a condition that the latest received writing pressure data is zero, sub-step S153 is performed: determining whether last writing pressure data in the second cache queue is zero.

Further, under a condition that the last writing pressure data in the second cache queue is zero, sub-step S154 is performed: replacing the last writing pressure data in the second cache queue with the latest received writing pressure data, and replacing acquisition time corresponding to the last writing pressure data in the second cache queue with the acquisition time of the latest received writing pressure data.

Under a condition that the last writing pressure data in the second cache queue is not zero, the above sub-step S152 is performed: packaging and writing the latest received writing pressure data and the acquisition time of the latest received writing pressure data into the second cache queue.

It should be understood that, in the embodiments of the present application, according to the above method, multiple writing pressure data with zero pressure values can be prevented from being continuously written into the second cache queue (that is, there is at most one write pressure data with a zero pressure value between two non-zero writing pressure data), thereby avoiding invalid write pressure data occupying too much cache space. In addition, the amount of data buffered in the second cache queue can also be reduced through the above process. Therefore, in the embodiments of the present application, the above method can also simplify the matching process of the writing coordinate data and the writing pressure data in the subsequent process.

In addition, it should also be understood that, in the embodiments of the present application, for multiple consecutive writing pressure data with zero pressure values, only the latest one (that is, the one having the latest acquisition time) can be stored in the second cache queue, which can not only reduce the amount of buffered data, but also simplify the matching process of the writing coordinate data and the writing pressure data based on the acquisition time of each writing pressure data. Further, the writing pressure data corresponding to different writing actions can be isolated according to the writing pressure data with zero pressure value, thereby facilitating accurate identification of different writing actions.

Figure 4:
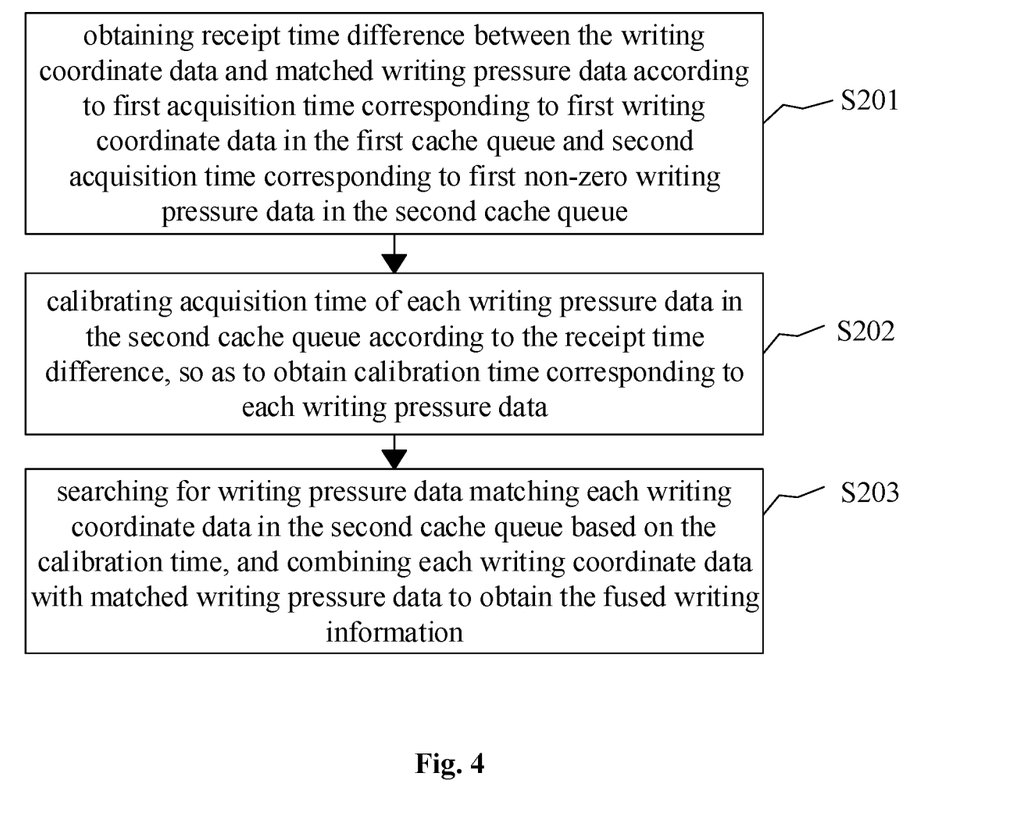
FIG. 4 is a schematic flowchart of sub-steps of step S30 in FIG. 2.

Further, referring to FIG. 4, in an embodiment of the present application, the above step S20 may include sub-steps S201 to S203.

Sub-step S201: obtaining receipt time difference between the writing coordinate data and matched writing pressure data according to first acquisition time corresponding to first writing coordinate data in the first cache queue and second acquisition time corresponding to first non-zero writing pressure data in the second cache queue.

Sub-step S202: calibrating acquisition time of each writing pressure data in the second cache queue according to the receipt time difference, so as to obtain calibration time corresponding to each writing pressure data.

Sub-step S203: searching for writing pressure data matching each writing coordinate data in the second cache queue based on the calibration time, and combining each writing coordinate data with matched writing pressure data to obtain the fused writing information.

The above calibration process and matching process will be described in detail below with reference to FIG. 5.

In the embodiments of the present application, the transmission paths and the transmission speeds of the writing pressure data collected by the second device and the writing coordinate data collected by the first device are different, and the collection frequencies of the writing pressure data and the writing coordinate data may also be different. Therefore, there will be a certain receipt time difference between the acquisition time of the writing coordinate data and the writing pressure data corresponding to the current writing action.

Figure 5:
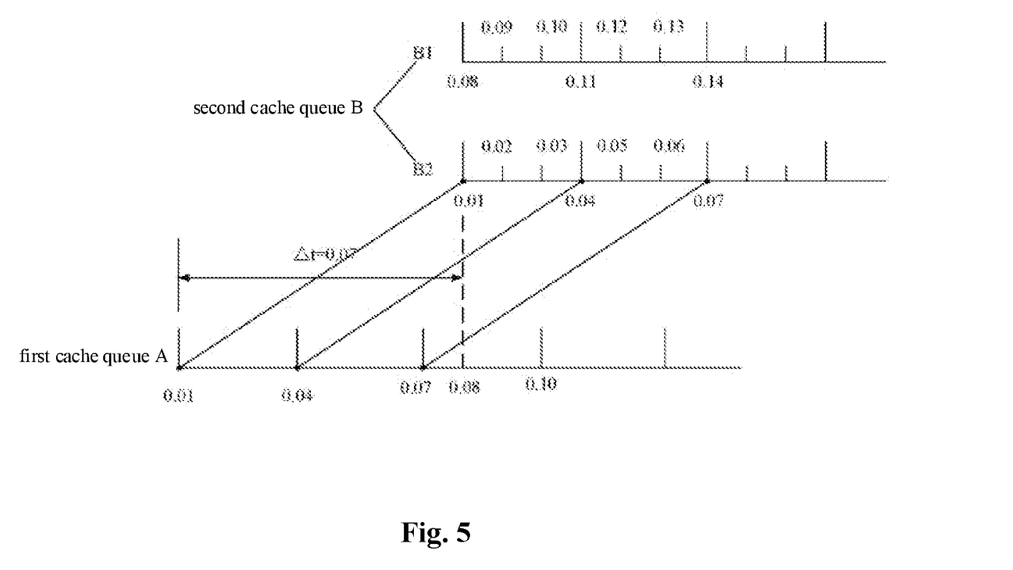
FIG. 5 is a schematic diagram of the time calibration and data matching process in the method for generating handwriting provided by an embodiment of the present application.

As shown in the first cache queue A and the second cache queue B1 in FIG. 5, in a possible embodiment, the acquisition time of the first writing coordinate data collected by the first device is 0.01, and the acquisition time of the first non-zero writing pressure data collected by the second device is 0.08. Therefore, there is a receipt time difference of 0.07 between the two acquisition times. It should be noted that, the second device will send the writing pressure data to the above electronic device 20 at a certain frequency after it is started, and the user usually does not start the writing action at this time. In other words, the first writing pressure data in the second cache queue is usually zero. Therefore, in order to accurately calculate the receipt time difference between the writing coordinate data and the writing pressure data, in the embodiments of the present application, the acquisition time corresponding to the first writing coordinate data in the first cache queue and the acquisition time corresponding to the first non-zero writing pressure data in the second cache queue should be used.

It should also be noted that, in the embodiments of the present application, the above 0.01 and 0.08 represent relative time based on the system clock. For example, if 0.01 represents 01:00:00.00 Beijing time (that is, one o'clock sharp), then 0.08 represents 01:00:00.07 Beijing time, and the receipt time difference there between is 0.07 seconds.

Continuing to refer to FIG. 5, in the embodiments of the present application, the collection frequencies of the first device and the second device may also be different. For example, in a possible embodiment, the first device collects the writing coordinate data every 0.03 seconds, and the second device collects the writing pressure data every 0.01 seconds. At this time, there is not only a receipt time difference between the writing coordinate data and the writing pressure data, but also a one-to-many correspondence (that is, the data volume of the writing coordinate data stored in the first cache queue is smaller than the data volume of the writing pressure data stored in the second cache queue). Therefore, it is difficult to accurately match the writing coordinate data and the writing pressure data.

To solve this problem, the embodiments of the present application provide a time compensation-based way to match the writing coordinate data and the writing pressure data, so as to improve the accuracy of the matching of the writing coordinate data and the writing pressure data.

Specifically, according to the first acquisition time corresponding to the first writing coordinate data in the first cache queue and the second acquisition time corresponding to the first non-zero writing pressure data in the second cache queue, the receipt time difference between the writing coordinate data and the writing pressure data corresponding to the first writing action may be obtained. Then, the acquisition time of each writing pressure data in the second cache queue is calibrated according to the receipt time difference, so as to obtain the calibration time corresponding to each writing pressure data.

As shown in FIG. 5, in the second cache queue B1, the acquisition time of the first non-zero writing pressure data is 0.08, the acquisition time of the second writing pressure data is 0.09, the acquisition time of the third writing pressure data is 0.10, the acquisition time of the fourth writing pressure data is 0.11 . . . , and the above receipt time difference is 0.07 seconds (that is, the acquisition time of the writing pressure data written into the second cache queue is 0.07 seconds later than the acquisition time of the matched writing coordinate data written into the first cache queue). After calibration, in the second cache queue, the calibration time of the first writing pressure data is 0.01, the calibration time of the second writing pressure data is 0.02, the calibration time of the third writing pressure data is 0.03, and the calibration time of the fourth writing pressure data is 0.04 . . . , that is, the second cache queue B2 is obtained.

Further, after the calibration time corresponding to each writing pressure data is obtained, each writing coordinate data in the first cache queue can be accurately matched with the writing pressure data based on the calibration time.

Specifically, in some possible implementations of the embodiments of the present application, the writing coordinate data corresponding to the current writing action may only include one pen-down point coordinate data and one pen-up point coordinate data (for example, the user clicks the touch panel with the stylus without sliding). At this time, starting from the head of the second cache queue, the writing pressure data whose calibration time is closest to the acquisition time of the pen-down point coordinate data may be searched and used as the writing pressure data matching the pen-down point coordinate data. Then, starting from the next one of the writing pressure data matching the pen-down point coordinate data in the current writing action, the writing pressure data whose calibration time is closest to acquisition time of the pen-up point coordinate data may be searched and used as the writing pressure data matching the pen-up point coordinate data.

It should be noted that, in the embodiments of the present application, the above current writing action represents the entire coherent action of the user during the process of writing from pen-down to pen-up. For example, the action of writing the Chinese character "丶" can be regarded as a writing action, and the action of writing the Chinese character "丿" can also be regarded as a writing action.

Alternatively, for a writing action that only includes pen-down point coordinate data and pen-up point coordinate data, the pen-down point coordinate data is the pen-up point coordinate data. Therefore, in another implementation of the embodiment of the present application, the writing pressure data matching the pen-down point coordinate data in the current writing action can also be directly used as the writing pressure data matching the pen-up point coordinate data, thereby simplifying the matching process of the pen-up point coordinate data and the writing pressure data.

Further, in some other possible implementations of the embodiments of the present application, the writing coordinate data corresponding to the current writing action may also include one pen-down point coordinate data, one pen-up point coordinate data, and at least one moving point coordinate data. Here, the pen-down point coordinate data represents the position of the pen-down point during the writing, the movement point coordinate data represents the moving path from the pen-down point to the pen-up point, and the pen-up point coordinate data represents the position of the pen-up point during the writing. The methods for identifying the above pen-down point, moving point, and pen-up point are not limited, and the technical personnel can choose or set the methods by themselves, which will not be discussed in detail in the present application.

Specifically, under a condition that the writing coordinate data corresponding to the current writing action includes one pen-down point coordinate data, one pen-up point coordinate data, and at least one moving point coordinate data, for the pen-down point coordinate data in the writing action, the matching process can be the same as the matching process when only one pen-down point coordinate data and one pen-up point coordinate data are included. That is, starting from the head of the second cache queue, the writing pressure data whose calibration time is closest to the acquisition time of the pen-down point coordinate data may be searched and used as the writing pressure data matching the pen-down point coordinate data.

For example, under a condition that the acquisition time of the first writing coordinate data in the first cache queue is 0.01, and the calibration time corresponding to the second writing pressure data in the second cache queue is 0.01, it means that the calibration time corresponding to the second writing pressure data in the second cache queue is closest to the acquisition time corresponding to the first writing coordinate data in the first cache queue, and the second writing pressure data in the second cache queue can be used as the writing pressure data matching the first writing coordinate data in the first cache queue. In other words, the second writing pressure data in the second cache queue is used as the writing pressure data matching the pen-down point coordinate data. It should be noted that, in this embodiment, the matching is performed according to the acquisition time of the writing coordinate data and the calibration time of the writing pressure data. Under a condition that the calibration time of the first writing pressure data in the second cache queue is closest to the acquisition time of the pen-down point coordinate data, the first writing pressure data in the second cache queue can also be used as the writing pressure data matching the pen-down point coordinate data. Moreover, in the embodiments of the present application, the acquisition time of the writing coordinate data is not necessarily equal to the calibration time of the matched writing pressure data.

Further, in order to simplify the matching process of the writing coordinate data and the writing pressure data as much as possible, for the above moving point coordinate data in the writing action including one pen-down point coordinate data, one pen-up point coordinate data, and at least one moving point coordinate data, starting from the next one of the writing pressure data matching the above pen-down point coordinate data (the pen-down point coordinate data in the same writing action), the writing pressure data whose calibration time is closest to the acquisition time of the moving point coordinate data may be searched and used as the writing pressure data matching the moving point coordinate data. For example, under a condition that the acquisition time of the first moving point coordinate data is 0.04, the acquisition time of the second moving point coordinate data is 0.07, and the calibration time of the pressure data located behind the writing pressure data matching the pen-down point coordinate data is 0.02, 0.03, 0.04, 0.05, 0.06, 0.07 in order, then the search starts from the writing pressure data whose calibration time is 0.02, the writing pressure data whose calibration time is 0.04 may be used as the writing pressure data matching the first moving point coordinate data, and the writing pressure data whose calibration time is 0.07 may be used as the writing pressure data matching the second moving point coordinate data.

Alternatively, considering that when there are multiple moving point coordinate data in a same writing action, for each moving point coordinate data, if the search all starts from the writing pressure data matching the pen-down point coordinate data, the data processing amount of the electronic device will be increased, and the matching speed of the writing coordinate data and the writing pressure data will be reduced. Therefore, in another possible implementation of the present application, in order to further simplify the matching process of the writing coordinate data and the writing pressure data, before the step of searching for writing pressure data whose calibration time is closest to the acquisition time of the moving point coordinate data as the writing pressure data matching the moving point coordinate data, whether the moving point coordinate data is the first moving point coordinate data of the current writing action may be determined first.

At this time, under a condition that the moving point coordinate data is the first moving point coordinate data in the current writing action, the above step may be performed: searching, from next one of the writing pressure data matching the pen-down point coordinate data of the current writing action, for writing pressure data whose calibration time is closest to the acquisition time of the moving point coordinate data as the writing pressure data matching the moving point coordinate data. On the contrary, starting from next one of writing pressure data matching previous moving point coordinate data of the current writing action, the writing pressure data whose calibration time is closest to the acquisition time of the moving point coordinate data may be searched and used as the writing pressure data matching the moving point coordinate data.

Further, in the embodiments of the present application, for the above pen-up point coordinate data in the writing action including one pen-down point coordinate data, one pen-up point coordinate data and at least one moving point coordinate data, starting from next one of the writing pressure data matching the last moving point coordinate data in the same writing action, the writing pressure data whose calibration time is closest to acquisition time of the pen-up point coordinate data may be searched and used as the writing pressure data matching the pen-up point coordinate data. For the specific search process, reference may be made to the above pen-down point coordinate data and the moving point coordinate data, which will not be repeated here.

Alternatively, for a writing action including one pen-down point coordinate data, one pen-up point coordinate data and at least one moving point coordinate data, the pen-up point coordinate data is the same as the last moving point coordinate data. Therefore, in a possible implementation, in order to further simplify the matching process of the pen-up point coordinate data and the writing pressure data, the writing pressure data matching the last moving point coordinate data can also be directly used as the writing pressure data matching the pen-up point coordinate data.

Further, considering that in the above matching process, for one writing coordinate data, two writing pressure data whose calibration time is closest to the acquisition time of the writing coordinate data may be found at the same time. Therefore, in some possible embodiments of the present application, under a condition that there are two closest writing pressure data, the average value of the two pressure data may be used as the writing pressure data matching the current writing coordinate data.

It should be noted that, in the embodiments of the present application, by simplifying the matching process of the writing coordinate data and the writing pressure data, the calculation amount of the electronic device 20 in the data matching process can be greatly reduced, thereby improving the response speed of the electronic device 20 to generate the handwriting, and improving the user experience when writing with the electronic device.

Further, after the above matching process is completed, the writing pressure data matching each writing coordinate data can be accurately obtained. In the embodiments of the present application, the fused writing information may be obtained by fusing each writing coordinate data with its matched writing pressure data. Then, based on the fused writing information, the handwriting having a thickness that changes with the writing pressure data and the writing coordinate data can be generated, thereby achieving a writing effect with more accurate thickness control.

Since the meaning represented by the fused writing information and the generation principle of the handwriting that changes with the writing pressure data and the writing coordinate data have been explained above, they will not be repeated here.

Further, in the embodiments of the present application, the writing coordinate data and the writing pressure data stored in the first cache queue and the second cache queue are useless after matching. Therefore, in an embodiment of the present application, it is also possible to detect in real time the first cache duration of each writing coordinate data written into the first cache queue (that is, the storage duration of the writing coordinate data in the first cache queue, which can also be understood as the time difference between the acquisition time of the cached writing coordinate data and the acquisition time of the latest received writing coordinate data), and detect in real time the second cache duration for each writing pressure data written into the second cache queue (that is, the storage duration of the writing pressure data in the second cache queue, which can also be understood as the time difference between the acquisition time of the cached writing pressure data and the acquisition time of the latest received writing pressure data). Then, under a condition that it is detected that the first cache duration corresponding to a certain writing coordinate data is greater than a first preset threshold, the certain writing coordinate data may be deleted from the first cache queue. Under a condition that it is detected that the second cache duration corresponding to a certain writing pressure data is greater than a second preset threshold, the certain writing pressure data may be deleted from the second cache queue. Therefore, the redundant data in the cache queue may be removed, and the storage space of the first cache queue and the second cache queue may be released.

It should be understood that, in the embodiments of the present application, the first preset threshold and the second preset threshold may be set according to actual requirements. For example, in a possible implementation, under a condition that the time for matching each writing coordinate data with the writing pressure data is 0.5 seconds, then both the first preset threshold and the second preset threshold may be set to be greater than 0.5 seconds, such as 1 second, 1.5 seconds, 2 seconds or any other value greater than 0.5 seconds, so as to ensure that the deleted writing coordinate data and the deleted writing pressure data have been matched (that is, to ensure that the deleted data are all redundant data).

Alternatively, in another possible implementation, the first preset threshold and the second preset threshold may also be set according to the duration corresponding to the current writing action. For example, under a condition that a certain writing action takes 5 seconds from pen-down to pen-up, the first preset threshold and the second preset threshold can be set to values slightly greater than 5 seconds, such as 7 seconds, 8 seconds or 10 seconds. Then, after the cache duration reaches the preset threshold, the writing coordinate data and writing pressure data corresponding to the previous writing action will be deleted. Therefore, it is ensured that while realizing adaptive adjustment of the deletion period of the cached data, the valid data in the first cache queue and the second cache queue will not be deleted.

Further, it should be noted that, in the embodiments of the present application, after the writing coordinate data in the first cache queue and the writing pressure data in the second cache queue are deleted, the starting position for searching the writing pressure data in the above matching the process can also be updated adaptively, thereby ensuring the accuracy of the matching process. For example, under a condition that the front 10 writing pressure data in the second cache queue are deleted, the $11^{th}$ writing pressure data in the second cache queue before the deletion (that is, the first pressure data in the second cache queue after the deletion) may be used as the new head of the second cache queue. Then, starting from the new head position, the writing pressure data matching the writing coordinate data may be searched.

To sum up, compared with the prior art, the method for generating handwriting provided in the embodiments of the present application has at least the following technical effects or advantages.

In the method for generating handwriting provided by the embodiments of the present application, according to the acquisition time of the writing coordinate data collected by the first device and the acquisition time of the writing pressure data collected by the second device, the writing coordinate data and the writing pressure data may be matched to obtain accurate fused writing information, and handwriting may be finally generated according to the fused writing information. Compared with the prior art, this method can generate more real handwriting that changes with the writing pressure data and the writing coordinate data, so as to achieve the effect of improving the writing effect and the user's writing experience.

Figure 6:
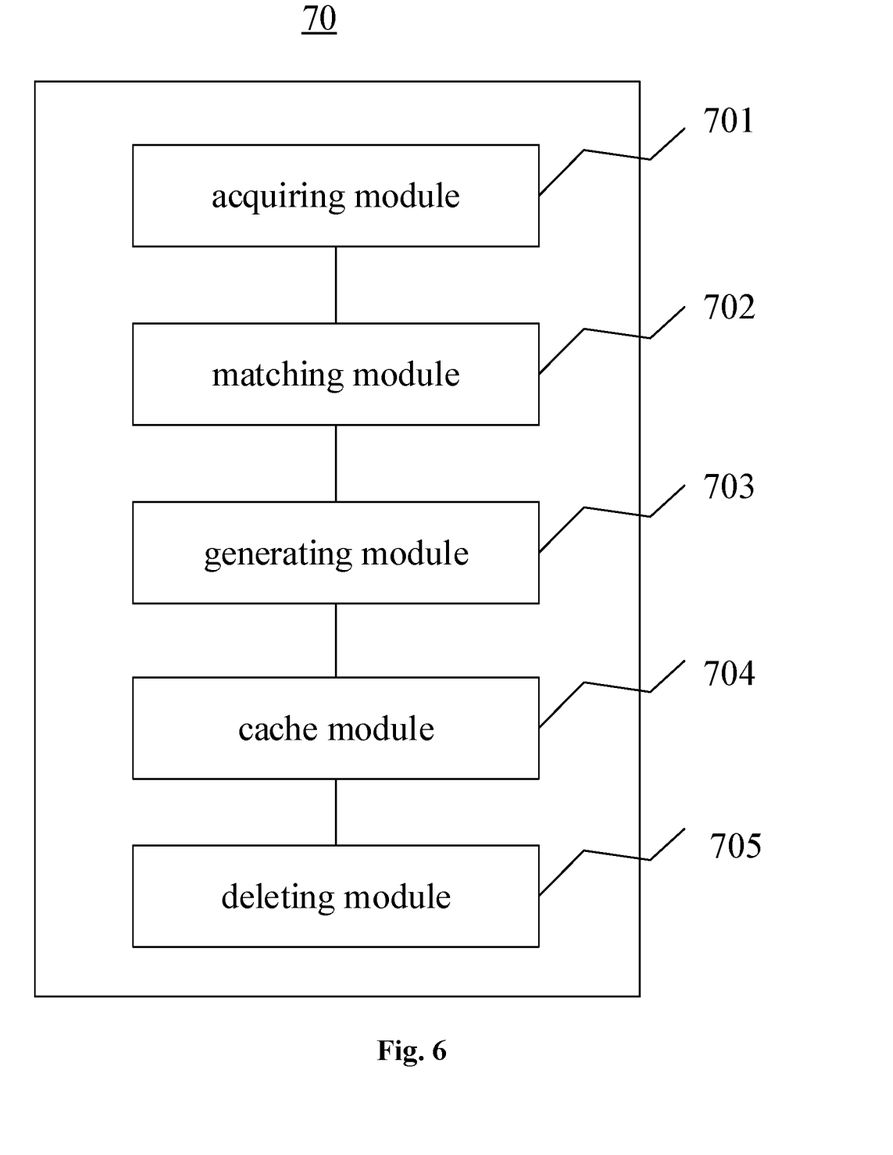
FIG. 6 is a schematic block diagram of an apparatus for generating handwriting provided by an embodiment of the present application.

Referring to FIG. 6, the embodiments of the present application further provide an apparatus 70 for generating handwriting, which can be applied to the above electronic device 20, so as to provide the above handwriting generating function for the electronic device 20.

In the embodiments of the present application, the electronic device 20 includes a first device, and the electronic device 20 is communicatively connected to a second device, wherein the first device is configured to collect writing coordinate data, the second device is configured to collect writing pressure data.

Specifically, referring to FIG. 6, in the embodiments of the present application, the apparatus 70 for generating handwriting includes an acquiring module 701, a matching module 702 and a generating module 703.

Here, the acquiring module 701 is configured to acquire the writing coordinate data collected by the first device and the writing pressure data collected by the second device; the matching module 702 is configured to match the writing coordinate data and the writing pressure data according to acquisition time of the writing coordinate data and acquisition time of the writing pressure data, so as to obtain fused writing information; the generating module 703 is configured to generate the handwriting according to the fused writing information.

Optionally, in an embodiment of the present application, the apparatus 70 for generating handwriting further includes a cache module 704 configured to:

package and write the writing coordinate data and the acquisition time of the writing coordinate data into a first cache queue;

package and write the writing pressure data and the acquisition time of the writing pressure data into a second cache queue.

Optionally, in an embodiment of the present application, when writing the writing pressure data into the second cache queue, the cache module 704 is specifically configured to:

determine whether latest received writing pressure data is zero;

under a condition that the latest received writing pressure data is not zero, package and write the latest received writing pressure data and acquisition time of the latest received writing pressure data into the second cache queue;

under a condition that the latest received writing pressure data is zero, determine whether last writing pressure data in the second cache queue is zero;

under a condition that the last writing pressure data in the second cache queue is zero, replace the last writing pressure data in the second cache queue with the latest received writing pressure data, and replace acquisition time corresponding to the last writing pressure data in the second cache queue with the acquisition time of the latest received writing pressure data;

under a condition that the last writing pressure data in the second cache queue is not zero, package and write the latest received writing pressure data and the acquisition time of the latest received writing pressure data into the second cache queue.

Optionally, in an embodiment of the present application, the matching module 702 is specifically configured to:

obtain receipt time difference between the writing coordinate data and matched writing pressure data according to first acquisition time of first writing coordinate data in the first cache queue and second acquisition time of first non-zero writing pressure data in the second cache queue;

calibrate acquisition time of each writing pressure data in the second cache queue according to the receipt time difference, so as to obtain calibration time corresponding to each writing pressure data;

search for writing pressure data matching each writing coordinate data in the second cache queue based on the calibration time, and combine each writing coordinate data with matched writing pressure data to obtain the fused writing information.

Optionally, the writing coordinate data corresponding to a current writing action includes pen-down point coordinate data and pen-up point coordinate data, and the matching module 702 is specifically configured to:

search, from head of the second cache queue, for writing pressure data whose calibration time is closest to acquisition time of the pen-down point coordinate data, and use the searched writing pressure data as the writing pressure data matching the pen-down point coordinate data of the current writing action;

use writing pressure data matching writing coordinate data located just before the pen-up point coordinate data of the current writing action as the writing pressure data matching the pen-up point coordinate data, or search, from next one of the writing pressure data matching the writing coordinate data located just before the pen-up point coordinate data of the current writing action, for writing pressure data whose calibration time is closest to acquisition time of the pen-up point coordinate data as the writing pressure data matching the pen-up point coordinate data.

Optionally, the writing coordinate data corresponding to the current writing action further includes moving point coordinate data, and acquisition time of the moving point coordinate data is between the acquisition time of the pen-down point coordinate data and the acquisition time of the pen-up point coordinate data, wherein the matching module 702 is further specifically configured to:

search, from next one of the writing pressure data matching the pen-down point coordinate data, for writing pressure data whose calibration time is closest to the acquisition time of the moving point coordinate data as the writing pressure data matching the moving point coordinate data.

Optionally, in an embodiment of the present application, the matching module 702 is further configured to:

before search, from the next one of the writing pressure data matching the pen-down point coordinate data, for writing pressure data whose calibration time is closest to the acquisition time of the moving point coordinate data as the writing pressure data matching the moving point coordinate data, determine whether the moving point coordinate data is first moving point coordinate data of the current writing action;

under a condition that the moving point coordinate data is the first moving point coordinate data of the current writing action, search, from next one of the writing pressure data matching the pen-down point coordinate data of the current writing action, for writing pressure data whose calibration time is closest to the acquisition time of the moving point coordinate data as the writing pressure data matching the moving point coordinate data;

under a condition that the moving point coordinate data is not the first moving point coordinate data of the current writing action, search, from next one of writing pressure data matching previous moving point coordinate data of the current writing action, for writing pressure data whose calibration time is closest to the acquisition time of the moving point coordinate data as the writing pressure data matching the moving point coordinate data.

Optionally, in an embodiment of the present application, the matching module 702 is further configured to:

search in the second cache queue for target writing pressure data whose calibration time is closest to the acquisition time of the writing coordinate data;

under a condition that more than one target writing pressure data is acquired, use an average value of all target writing pressure data as the writing pressure data matching the writing coordinate data.

Optionally, in an embodiment of the present application, the apparatus for generating handwriting further includes a deleting module 705 configured to:

detect a first cache duration for the writing coordinate data written into the first cache queue, and detect a second cache duration for the writing pressure data written into the second cache queue;

delete from the first cache queue the writing coordinate data whose first cache duration is greater than a first preset threshold, and delete from the second cache queue the writing pressure data whose second cache duration is greater than a second preset threshold.

Since the apparatus 70 for generating handwriting introduced in this embodiment is the apparatus used to realize the method for generating handwriting in the embodiments of the present application, based on the method for generating handwriting introduced in the embodiments of the present application, those skilled in the art can understand the specific implementation of the apparatus 70 for generating handwriting in this embodiment and its various variations, so how the apparatus 70 for generating handwriting implements the methods in the embodiments of the present application will not be described in detail here. As long as the apparatus 70 for generating handwriting is used by those skilled in the art to implement the method for generating handwriting in the embodiments of the present application, the apparatus falls within the protection scope of the present application.

In addition, the embodiments of the present application further provide a storage medium having a computer program stored thereon, wherein the computer program, when executed by a processor, cause the processor to perform each step in the above method for generating handwriting.

As will be appreciated by those skilled in the art, the embodiments of the present application may be provided as a method, a system, or a computer program product. Accordingly, the present application may take the form of an entirely hardware embodiment, an entirely software embodiment, or an embodiment combining software and hardware aspects. Furthermore, the present application may take the form of a computer program product embodied on one or more computer-readable storage media (including, but not limited to, a disk memory, a CD-ROM, an optical memory, etc.) having computer-readable program code stored therein.

The present application is described with reference to flowcharts and/or block diagrams of methods, apparatus (systems), and computer program products according to the embodiments of the present application. It will be understood that each flow and/or block in the flowcharts and/or block diagrams, and combinations of flows and/or blocks in the flowcharts and/or block diagrams, can be implemented by computer program instructions. These computer program instructions may be provided to a processor of a general purpose computer, a special purpose computer, an embedded processor or other programmable data processing device to produce a machine, such that the instructions executed by the processor of the computer or other programmable data processing device produce means for implementing the functions specified in one or more flows of the flowcharts and/or one or more blocks of the block diagrams.

These computer program instructions may also be stored in a computer-readable memory capable of directing a computer or other programmable data processing device to function in a particular manner, such that the instructions stored in the computer-readable memory result in an article of manufacture including instruction means for implementing the functions specified in one or more flows of the flowcharts and/or one or more blocks of the block diagrams.

These computer program instructions can also be loaded onto a computer or other programmable data processing device to cause a series of operational steps to be performed on the computer or other programmable device to produce a computer-implemented process, such that the instructions executed on the computer or other programmable device provide steps for implementing the functions specified in one or more flows of the flowcharts and/or one or more blocks of the block diagrams.

The above embodiments are only specific implementations of the present application, and are used to illustrate the technical solutions of the present application, but not to limit them. The protection scope of the present application is not limited thereto. Although the present application is described in detail with respect to the above embodiments, those of ordinary skill in the art should understand: within the technical scope disclosed in the present application, any person skilled in the art can modify the technical solutions described in the above embodiments, or can easily think of changes, or can equivalently replace some of the technical features; and these modifications, changes or replacements do not make the essence of the corresponding technical solutions deviate from the spirit and scope of the technical solutions in the embodiments of the present application, and should be included within the protection scope of the present application. Therefore, the protection scope of the present application should be subject to the protection scope of the claims.

What is claimed is:

1. A method for generating handwriting, wherein the method is applied to an electronic device comprising a first device, and the electronic device is communicatively connected to a second device, wherein the first device is configured to collect writing coordinate data, the second device is configured to collect writing pressure data, and the method comprises:

acquiring the writing coordinate data collected by the first device and the writing pressure data collected by the second device;

matching the writing coordinate data and the writing pressure data according to acquisition time of the writing coordinate data and acquisition time of the writing pressure data, so as to obtain fused writing information;

generating the handwriting according to the fused writing information, wherein before matching the writing coordinate data and the writing pressure data according to the acquisition time of the writing coordinate data and the acquisition time of the writing pressure data, the method further comprises:

packaging and writing the writing coordinate data and the acquisition time of the writing coordinate data into a first cache queue;

packaging and writing the writing pressure data and the acquisition time of the writing pressure data into a second cache queue.

2. The method according to claim 1, wherein packaging and writing the writing pressure data and the acquisition time of the writing pressure data into the second cache queue comprises:

determining whether latest received writing pressure data is zero;

under a condition that the latest received writing pressure data is not zero, packaging and writing the latest received writing pressure data and acquisition time of the latest received writing pressure data into the second cache queue;

under a condition that the latest received writing pressure data is zero, determining whether last writing pressure data in the second cache queue is zero;

under a condition that the last writing pressure data in the second cache queue is zero, replacing the last writing pressure data in the second cache queue with the latest received writing pressure data, and replacing acquisition time corresponding to the last writing pressure data in the second cache queue with the acquisition time of the latest received writing pressure data;

under a condition that the last writing pressure data in the second cache queue is not zero, packaging and writing the latest received writing pressure data and the acquisition time of the latest received writing pressure data into the second cache queue.

3. The method according to claim 1, wherein matching the writing coordinate data and the writing pressure data according to the acquisition time of the writing coordinate data and the acquisition time of the writing pressure data, so as to obtain fused writing information comprises:

obtaining receipt time difference between the writing coordinate data and matched writing pressure data according to first acquisition time of first writing coordinate data in the first cache queue and second acquisition time of first non-zero writing pressure data in the second cache queue;

calibrating acquisition time of each writing pressure data in the second cache queue according to the receipt time difference, so as to obtain calibration time corresponding to each writing pressure data;

searching for writing pressure data matching each writing coordinate data in the second cache queue based on the calibration time, and combining each writing coordinate data with matched writing pressure data to obtain the fused writing information.

4. The method according to claim 3, wherein the writing coordinate data corresponding to a current writing action comprises pen-down point coordinate data and pen-up point coordinate data, and searching for the writing pressure data matching each writing coordinate data in the second cache queue based on the calibration time comprises:

searching, from head of the second cache queue, for writing pressure data whose calibration time is closest to acquisition time of the pen-down point coordinate data, and using the searched writing pressure data as the writing pressure data matching the pen-down point coordinate data of the current writing action;

using writing pressure data matching writing coordinate data located just before the pen-up point coordinate data of the current writing action as the writing pressure data matching the pen-up point coordinate data, or searching, from next one of the writing pressure data matching the writing coordinate data located just before the pen-up point coordinate data of the current writing action, for writing pressure data whose calibration time is closest to acquisition time of the pen-up point coordinate data as the writing pressure data matching the pen-up point coordinate data.

5. The method according to claim 4, wherein the writing coordinate data corresponding to the current writing action further comprises moving point coordinate data, and acquisition time of the moving point coordinate data is between the acquisition time of the pen-down point coordinate data and the acquisition time of the pen-up point coordinate data, wherein searching for the writing pressure data matching each writing coordinate data in the second cache queue based on the calibration time further comprises:

searching, from next one of the writing pressure data matching the pen-down point coordinate data, for writing pressure data whose calibration time is closest to the acquisition time of the moving point coordinate data as the writing pressure data matching the moving point coordinate data.

6. The method according to claim 5, wherein before searching, from the next one of the writing pressure data matching the pen-down point coordinate data, for writing pressure data whose calibration time is closest to the acquisition time of the moving point coordinate data as the writing pressure data matching the moving point coordinate data, the method further comprises:

determining whether the moving point coordinate data is first moving point coordinate data of the current writing action;

under a condition that the moving point coordinate data is the first moving point coordinate data of the current writing action, performing step of searching, from next one of the writing pressure data matching the pen-down point coordinate data of the current writing action, for writing pressure data whose calibration time is closest to the acquisition time of the moving point coordinate data as the writing pressure data matching the moving point coordinate data;

under a condition that the moving point coordinate data is not the first moving point coordinate data of the current writing action, searching, from next one of writing pressure data matching previous moving point coordinate data of the current writing action, for writing pressure data whose calibration time is closest to the acquisition time of the moving point coordinate data as the writing pressure data matching the moving point coordinate data.

7. The method according to claim 3, wherein searching for the writing pressure data matching each writing coordinate data in the second cache queue based on the calibration time further comprises:

searching in the second cache queue for target writing pressure data whose calibration time is closest to the acquisition time of the writing coordinate data;

under a condition that more than one target writing pressure data is acquired, using an average value of all target writing pressure data as the writing pressure data matching the writing coordinate data.

8. The method according to claim 1, wherein the method further comprises:
   detecting a first cache duration for the writing coordinate data written into the first cache queue, and detecting a second cache duration for the writing pressure data written into the second cache queue;
   deleting from the first cache queue the writing coordinate data whose first cache duration is greater than a first preset threshold, and deleting from the second cache queue the writing pressure data whose second cache duration is greater than a second preset threshold.

9. A non-transitory computer readable storage medium comprising a computer program, wherein the computer program is configured to implement the method according to claim 1.

10. An electronic device comprising a memory and a processor, wherein the memory is configured to store a computer program, and the processor is configured to load and execute the computer program to cause the electronic device to perform the method according to claim 1.

11. A system for generating handwriting, wherein the system comprises a second device and the electronic device according to claim 10.

* * * * *